(12) United States Patent
Tanaka (10) Patent No.: US 8,340,508 B2
(45) Date of Patent: Dec. 25, 2012

(54) RECORD/PLAYBACK APPARATUS AND CONTROL METHOD THEREFOR

(75) Inventor: Shuya Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1057 days.

(21) Appl. No.: 12/115,498

(22) Filed: May 5, 2008

(65) Prior Publication Data

US 2008/0279526 A1    Nov. 13, 2008

(30) Foreign Application Priority Data

May 7, 2007    (JP) ................................ 2007-122801

(51) Int. Cl.
*H04N 5/783*    (2006.01)
(52) U.S. Cl. ....................................................... 386/343
(58) Field of Classification Search ............................ None
See application file for complete search history.

(56) References Cited

U.S. PATENT DOCUMENTS

| | | | | |
|---|---|---|---|---|
| 2002/0031329 A1* | 3/2002 | Ando et al. | ...................... | 386/46 |
| 2006/0120692 A1* | 6/2006 | Fukuta | ............................ | 386/95 |

FOREIGN PATENT DOCUMENTS

| | | |
|---|---|---|
| JP | 2004-206784 A | 7/2004 |
| JP | 2005-166168 A | 6/2005 |
| JP | 2006-139846 A | 6/2006 |

OTHER PUBLICATIONS

Japanese Office Action for Appln. No. 2007-122801 dated Aug. 12, 2011.

* cited by examiner

*Primary Examiner* — Brandon Hoffman
(74) *Attorney, Agent, or Firm* — Carter, DeLuca, Farrell & Schmidt LLP (57) ABSTRACT

In a record/playback apparatus, if playback of image data is stopped, recording information relating to a stop point at which the playback of the image data is stopped and generating image data playback control information that specifies a playback resume point based on the stop point at which the playback of the image data is stopped. When the image data is recorded onto another recording medium, the playback control information is recorded together with the image data as resume information, thereby providing a user-friendly resume playback function.

8 Claims, 8 Drawing Sheets

RECORD/PLAYBACK APPARATUS AND CONTROL METHOD THEREFOR

BACKGROUND OF THE INVENTION

1. Field of the Invention

The present invention relates to a record/playback apparatus and a control method therefor, and more particularly, to a record/playback apparatus that is able to generate playback control information and a control method therefor.

2. Description of the Related Art

Conventionally, in a record/playback apparatus that is able to record and play back moving images, a resume playback function is known, where if an instruction to stop playback is issued during playback of the moving images, the playback stop point is stored, and in a next playback of the moving images, playback is resumed from the stored playback stop point.

For example, in a Digital Versatile Disc (DVD) recorder provided with a hard disk drive (HDD), if playback of a DVD is stopped along the way, identification information (media ID) for the DVD media and information (resume information) on the playback stop point which are associated with each other are stored in a built-in HDD, thereby allowing playback to be resumed from the continuation of the previous playback based on the resume information stored in the built-in HDD when the same apparatus is used to carry out playback the next time even if the DVD media is once removed from the apparatus (see Japanese Patent Laid-Open No. 2004-206784).

However, for example, as described in Japanese Patent Laid-Open No. 2004-206784, even if identification information for the removable media and resume information are associated with each other and stored in the HDD, the resume information is not able to be acquired from the removable media. Therefore, when another apparatus is used to play back the removable media, the resume information is not able to be utilized.

Thus, if a record/playback apparatus in a room is used to play back moving images partway, and another apparatus, for example, a portable player or an in-car player, is used to play back the removable media on which the moving images are recorded, playback is always resumed from the beginning.

SUMMARY OF THE INVENTION

The present invention is conceived in light of the problems of the conventional art described above.

The present invention provides a record/playback apparatus that achieves a user-friendly resume playback function and a control method therefor.

According to one aspect of the present invention, there is provided a record/playback apparatus that includes: a playback unit which plays back image data recorded on a first recording medium; a first generating unit which generates stop point information specifying a stop point at which playback of the image data is stopped; a second generating unit which generates, based on the stop point information, playback control information specifying a resume point at which playback of the image data resumes; and a recording unit which records the image data and the playback control information on a second recording medium.

According to another aspect of the present invention, there is provided a control method for a record/playback apparatus includes: playing back image data recorded on a first recording medium; generating stop point information specifying a stop point at which playback of the image data is stopped; generating, based on the stop point information, playback control information specifying a resume point at which playback of the image data resumes; and recording the image data and the playback control information on a second recording medium.

According to still another aspect of the present invention, there is provided a record/playback apparatus that includes: a playback unit which plays back image data from a first recording medium; a first generating unit which generates stop point information specifying a stop point at which playback of the image data is stopped; a second generating unit which generates, based on the stop point information, playback control information that controls an order of playback of the image data so as to play back the image data in a predetermined order from the stop point; and a recording unit which records the image data and the playback control information on a second recording medium.

According to yet another aspect of the present invention, there is provided a control method for a record/playback apparatus includes: playing back image data from a first recording medium; generating stop point information specifying a stop point at which playback of the image data is stopped; generating playback control information that controls an order of playback of the image data so as to play back the image data in a predetermined order from the stop point; and recording the image data and the playback control information on a second recording medium.

Further features of the present invention will become apparent from the following description of exemplary embodiments with reference to the attached drawings.

DESCRIPTION OF THE EMBODIMENTS

Various embodiments of the present invention are described in detail below with reference to the accompanying drawings.

Figure 1:
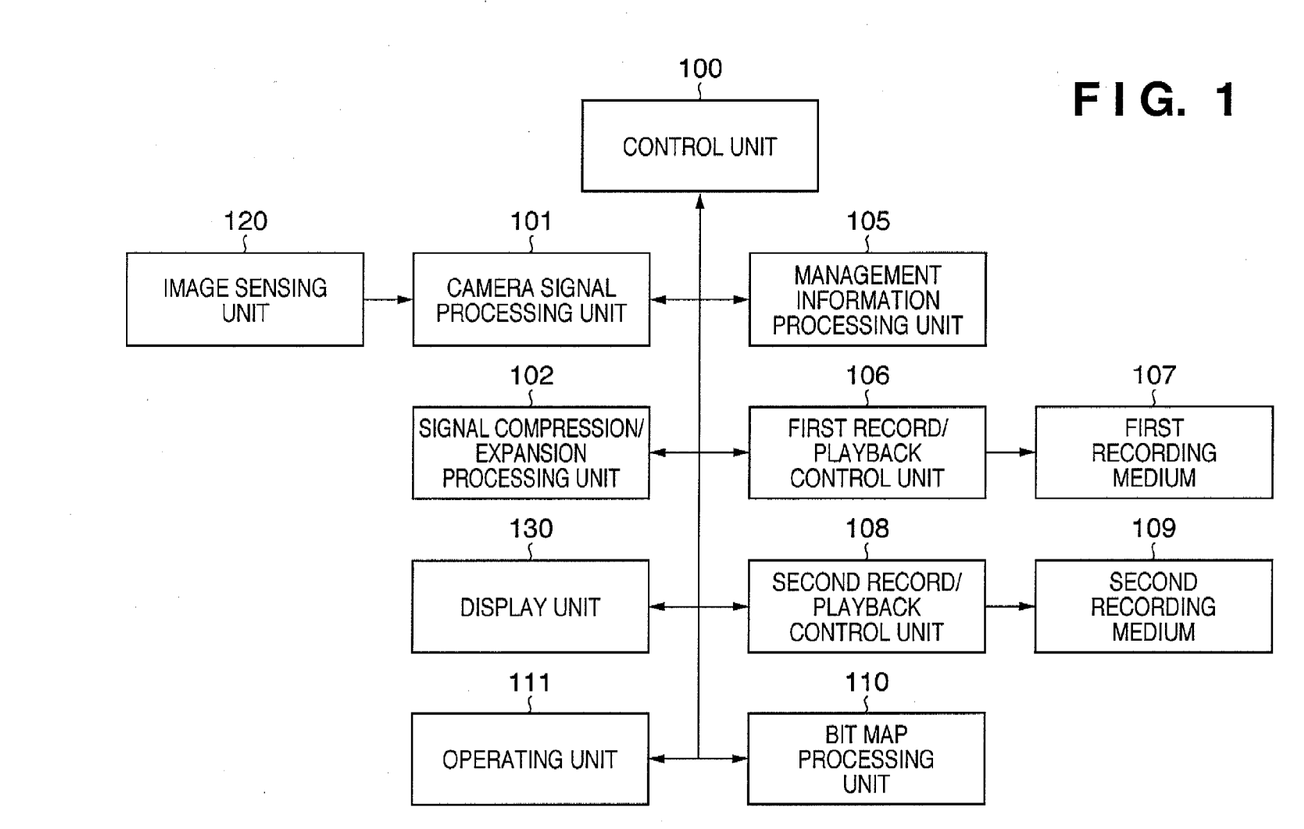
FIG. 1 is a block diagram illustrating a configuration example of a digital video camera as an example of a record/playback apparatus according to an embodiment of the present invention.

FIG. 1 is a block diagram illustrating a configuration example of a digital video camera as an example of a record/playback apparatus according to an embodiment of the present invention.

In FIG. 1, a control unit 100 controls each unit of the digital video camera to achieve various types of operations including playback processing as described below. The control unit 100 includes a CPU, a ROM that stores a program executed by the CPU, and a RAM that is used by the CPU during execution of the program, which are not shown. The CPU executes the program stored in the ROM to control the operations of the entire digital video camera.

An image sensing unit 120 includes a lens, an aperture, an image sensor, and an A/D converter, which are not shown, and senses subject optical images and outputs digital data (camera signals) representing the subject optical images. The image sensing unit 120 may also include a microphone. In this case, the image sensing unit 120 also outputs sound signals.

A camera signal processing unit 101 subjects the camera signals output by the image sensing unit 120 to predetermined signal processing to convert the camera signals into image signals that comply with standards. A signal compression/expansion processing unit 102 subjects the image signals output by the camera signal processing unit 101 to compression encoding in a format determined in accordance with the recording format. Compression encoding formats include, for example, MPEG2 and MPEG4. Further, the sound signals may be subjected to compression encoding in a format that is different from that used for the moving images. Compression encoding formats for sound signals include, for example, MP3, AAC, and G.726.

The signal compression/expansion processing unit 102 also carries out processing for generating, from the encoded moving images and sound data, data files (image data) with a data format in accordance with the recording format, where processing is carried out in such a way that supplemental information such as management information as described below is, if needed, included in a predetermined area of the image data, or generated as a management information file associated with the image data.

Further, the signal compression/expansion processing unit 102 applies decoding processing to image data read out from a first or a second recording medium 107 or 109, and outputs image and sound signals that are able to be viewed and heard on a display unit 130 or an externally connected display apparatus.

A management information processing unit 105 creates management information for image data. The management information for image data includes such information as a file size, a file name, a recording starting time, a recording ending time, and a recording length. The management information processing unit 105 also generates, as one piece of the management information, playback control information (described below) that is used as resume information.

A first record/playback control unit 106 controls record/playback of the first recording medium 107. The first recording medium 107 can be, for example, a built-in HDD with a capacity greater than that of the second recording medium.

A second record/playback control unit 108 controls record/playback of the second recording medium 109. The second recording medium 109 can be, for example, a memory card as an example of removable recording media. As another example, any variety of removable storage media capable of storing image data may alternatively be used.

As described above, in the present embodiment, the first recording medium 107 is a fixed recording medium, while the second recording medium 109 is a removable recording medium. However, it is sufficient if at least one of the first and second recording media 107 and 109 is a removable recording medium. In addition, it is not always necessary to be able to support two types of recording media.

The first and second record/playback units 106 and 108 record, in the first and second recording media 107 and 109, the image data associated with a management information file including at least some of the management information. The management information file is not necessary if all of the management information is included in the image data.

A bit map processing unit 110 generates a representative still image of the image data, for example, a thumbnail image. If the image data is composed of a plurality of scenes (described below), a representative still image may be generated for each scene. The representative still image is supported by the management information processing unit 105 as one piece of the management information. An operating unit 111 includes input devices such as buttons, dials, keys, and touch panels, and a user issues various types of instructions to the digital video camera by operating these input devices. The control unit 100 is notified of the operations of the operation unit 111, and the control unit 100 controls each unit in response to the operations to achieve operation in accordance with the instruction from the user.

Next, a playlist as an example of playback control information generated by the digital video camera of the present embodiment is described with reference to FIG. 2.

The playlist refers to playback control information that indicates a playback procedure for image data recorded on a certain recording medium and controls a playback procedure in a playback apparatus. The playlist is, for example, a set of information for specifying scenes and information for specifying playback sections in the scenes (for example, playback starting time and playback ending time based on the head of a scene), thereby allowing predetermined sections of image data to be controlled so as to be played back in a predetermined order.

The image data may be composed of one or more scenes. For example, a series of moving images taken continuously without any pauses may correspond to one scene, as may a series of moving images with a head image frame by which it can be determined whether the scene is changed. In FIG. 2, five scenes (scene 1, scene 2, scene 3, scene 4, and scene 5) are recorded in ascending order on a recording medium.

In the present embodiment, playback control information for specifying, as a playback resume point, a point at which playback is to be resumed (for example, a point at which the playback is stopped) is generated as resume information and recorded. Then, when the image data is copied or moved to another recording medium, the corresponding playback control information is recorded with the image data. Therefore, even if image data copied or moved to a separate recording medium is played back using another apparatus, resume playback can be achieved by playing back the image data in accordance with the playback control information.

The digital video camera of the present embodiment is able to generate three types of playlists. Examples of the playlists are shown in FIG. 2.

Figure 2:
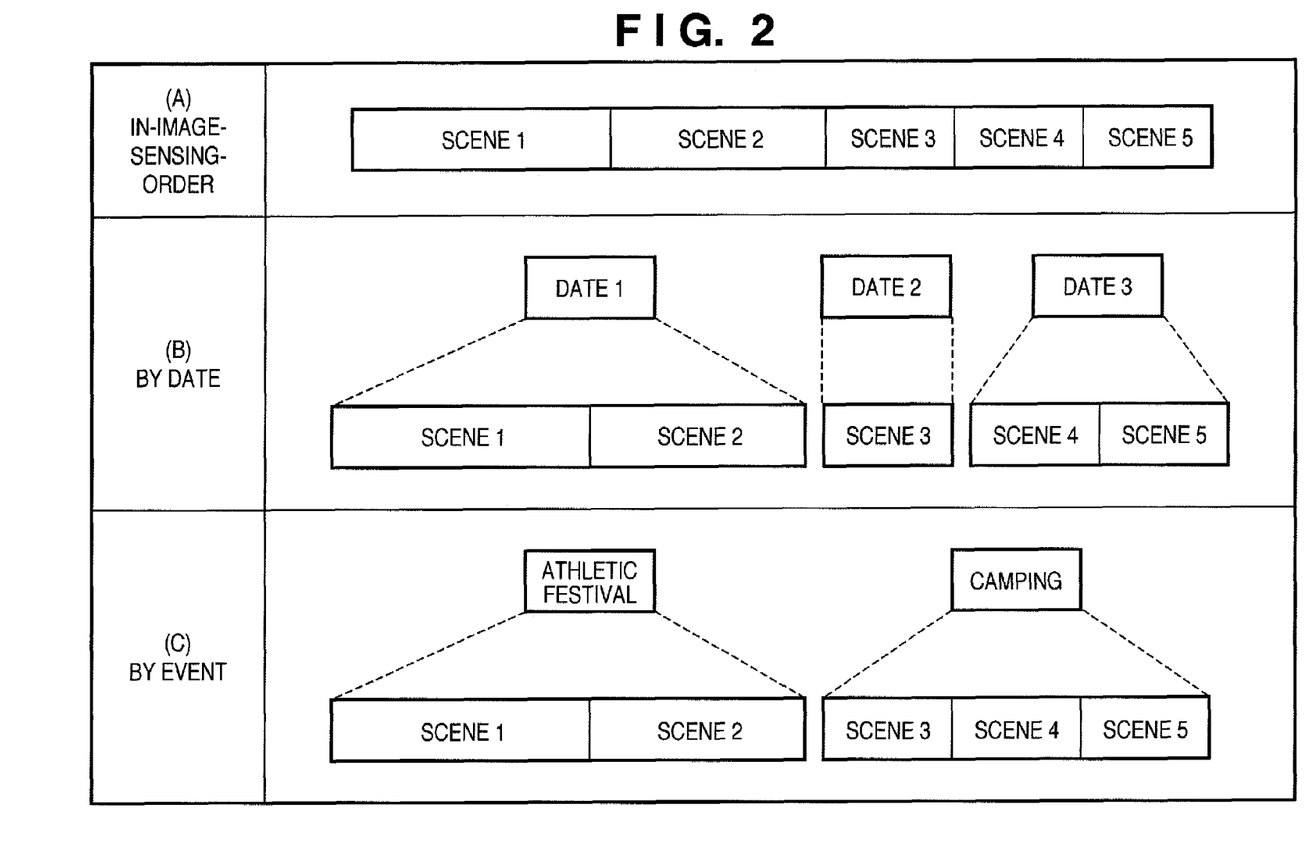
FIG. 2 is a diagram illustrating a playlist as an example of playback control information generated by the digital video camera according to the embodiment.

The (A) "in-image-sensing-order" playlist shown in FIG. 2 is a playlist corresponding to common playback processing, whereby scenes that constitute image data recorded on the second recording medium are sequentially played back in the image sensing order.

When an instruction to carry out playback in accordance with such a playlist is issued, a playback apparatus that is capable of interpreting the playlist sequentially plays back the scenes from the beginning of scene 1 to the end of scene 5. In particular, playback apparatus resumes playback from the head of scene 1, and then continues playback from the head of scene 2 once the playback to the end of scene 1 is completed. Except for the last scene of the sequence, (in this instance scene 5), once playback of a scene is completed, playback continues from the head of the next scene of the sequence.

When an instruction to play back the next scene is issued during playback of a scene (for example, scene 1), playback is resumed immediately from the head of the next scene (scene 2) in the playlist without playing back the remainder of the scene which is being played back.

The digital video camera of the present embodiment is further able to generate a playlist in which scenes are grouped together according to specified conditions.

The (B) "by date" playlists shown in FIG. 2 are three playlists in which scenes 1 to 5 are grouped by the date they were taken (sensed as subject optical images and converted to digital data (camera signals) representing the subject optical images). For example, scenes 1 and 2 were taken on the same date (date 1) and accordingly are grouped into a first group. Only scene 3 was taken on date 2, and accordingly is grouped in a second group by itself. Scenes 4 and 5 were taken on date 3 and accordingly are grouped in a third group. Respective information is generated for each group that identifies the scenes belonging to the group, with the information serving as a playlist for the group. The groups and the scenes belonging to each group are each arranged by ascending date.

For example, with regard to scenes 1 to 5, scenes 1 and 2, scene 3, and scenes 4 and 5 have been taken respectively on date 1, date 2, and date 3. The three groups corresponding to the three respective dates are generated as shown in the (B) "by date" playlists in FIG. 2.

In playback processing utilizing such the playlists, the three playlists corresponding to dates 1 to 3 are first presented to a user. Then, if an instruction to carry out playback on a date basis (for example, date 1) is issued, the scenes (scenes 1 and 2) associated with the date 1 are sequentially played back. If an instruction to play back the next scene is issued during playback of one scene (for example, scene 1), playback is resumed from the head of the next scene belonging to the same date (scene 2).

The (C) "by event" playlists shown in FIG. 2 are different from the "by date" playlists in that the grouping condition is grouping by event rater than by the image sensing date.

There is no particular limitation to how to set the event name for each scene. After sensing images, a user may operate the operating unit 111 to add the event name, or the digital video camera may automatically add the event name during image sensing in accordance with an image sensing mode or the like.

In the present embodiment, the keyword "athletic festival" and the keyword "camping" are set for scenes 1 and 2 and scenes 3 to 5 respectively. Thus, a playlist corresponding to the athletic festival and a playlist corresponding to the camping are generated. In playback utilizing the "by event" playlists, a user selects one of the two playlists, and the scenes of that playlist are then played back in ascending order.

A user may alternatively define one or more events and create one or more respective "by event" playlists using the digital video camera. In this case, the user may carry out, for example, the operations of inputting each event name and of selecting scene(s) corresponding to each event name from scenes 1 to 5. These operations can be carried out using the operating unit 111.

The digital video camera of the present embodiment can carry out playback in accordance with a playlist, and when the playback is stopped along the way, updates the playback resume point of the playlist which has been used for the playback in response to the change of the stop point. In this specification, of the playlists, that playlist which is utilized as resume information may be particularly referred to as a resume playlist. The playback resume point of the resume playlist may be a playback stop point or a point corresponding to a next frame after the playback stop point. In addition, while the playback is stopped, in addition to updating of the resume playlist, information for specifying the scene and the playback resume point is recorded as resume information for each playlist. Thus, for example, in the case of the "by date" playlists in FIG. 2, independent resume playlists and resume information are recorded for each of dates 1, 2, and 3.

Next, processing during playback with the digital video camera of the present embodiment is described with reference to flowcharts shown in FIGS. 4A to 4C.

Figure 4A:
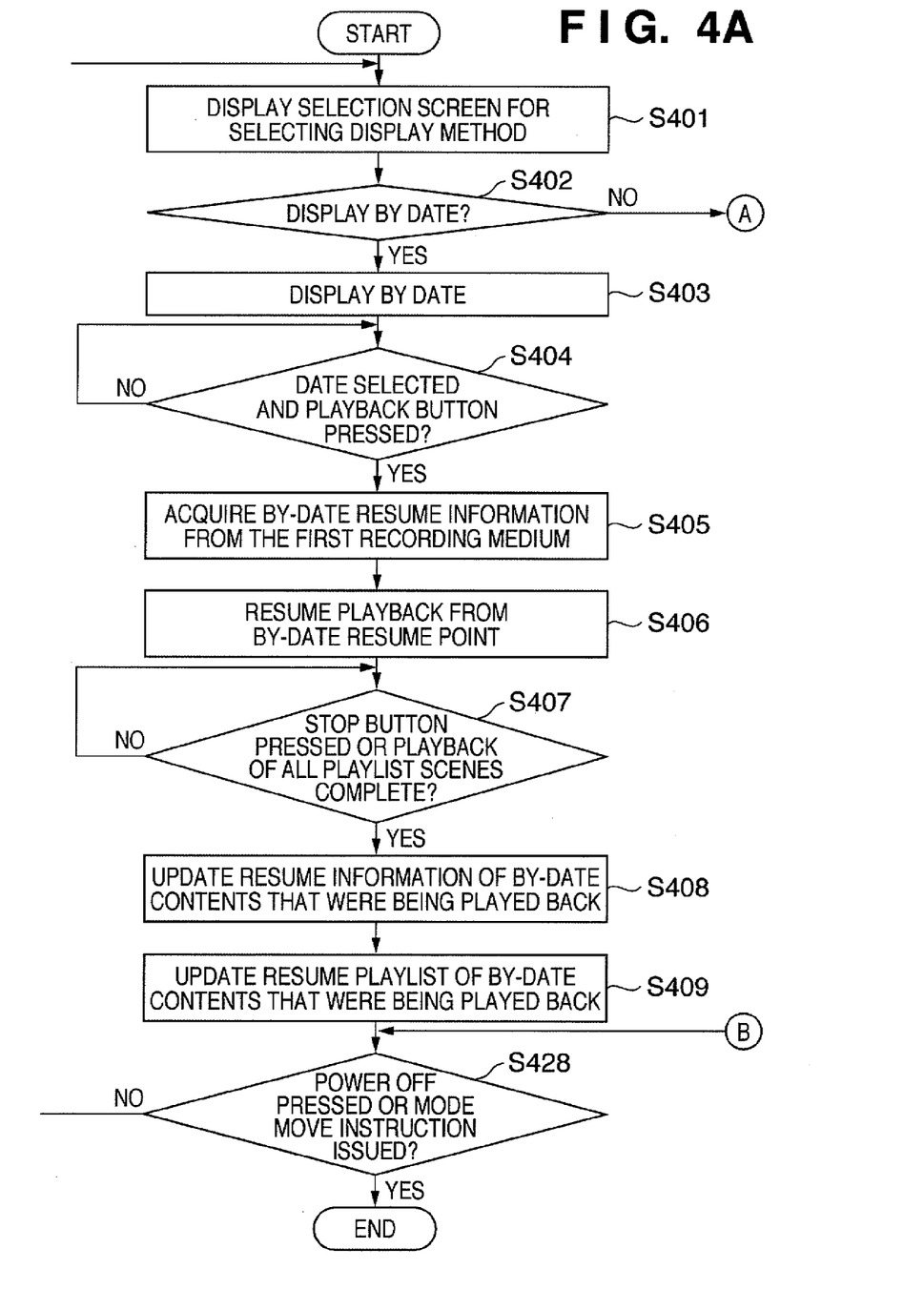
FIGS. 4A to 4C are flowcharts illustrating processing during playback with the digital video camera according to the embodiment.
Figure 4B:
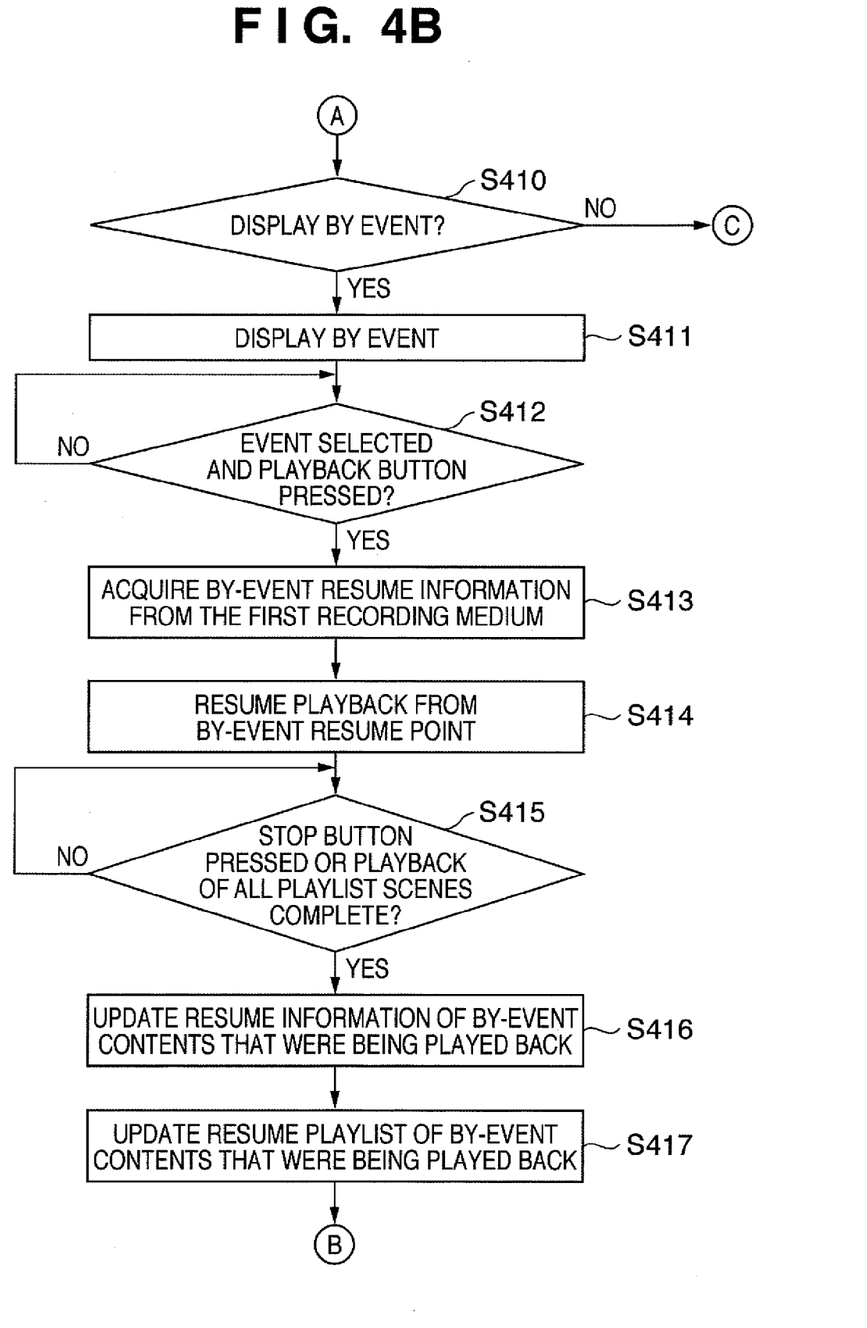
Figure 4C:
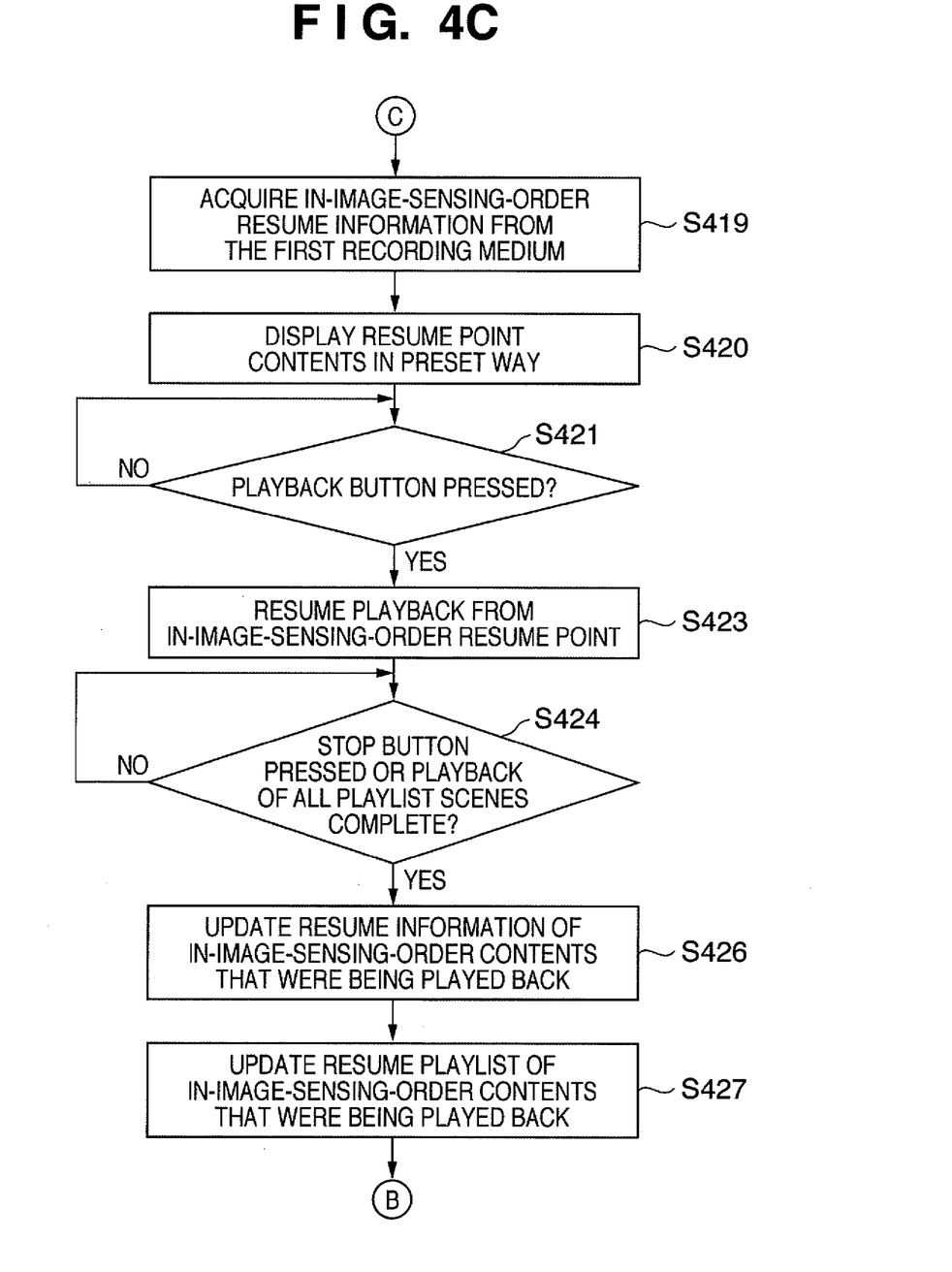

For example, operation of the operating unit 111 switches an operation mode to a playback mode, and processing shown in FIGS. 4A to 4C is executed by the control unit 100 when power is turned on in the playback mode. In the present embodiment, the recording medium to be subjected to playback in the playback mode is the first recording medium 107 by default.

First, in S401, the control unit 100 displays a selection screen for selecting a display method, for example, on the display unit 130, and allows a user to select a display method for image data in the first recording medium 107. Although it is possible to select any of (A) in-image-sensing-order, (B) by date, and (C) by event as the display method in the present embodiment, it is also possible to select any other display method.

When an instruction to select a display method is input through the operating unit 111, the control unit 100 identifies which display method is selected (S402 and S410).

If display by date is selected in S402, the control unit 100 groups together the image date recorded on the first recording medium 107 based on the image sensing dates, generates a display screen by date, and displays the display screen by date on the display unit 130 (S403). The display screen by date may have any format as long as users are able to select dates. For example, the display screen by date may be a screen for displaying a list of the image sensing dates of the image data recorded on the first recording medium 107. The control unit 100 waits for a playback instruction from a user through the display screen by date (S404).

The user operates the operating unit 111 to select, from the display screen by date, an image sensing date which is desired to be played back, and presses a playback button included in the operating unit 111. The control unit 100 then acquires, from the first recording medium 107, resume information corresponding to the date selected on the display screen by date (S405). In this embodiment, the resume information may have any format as long as the resume information is able to specify a playback resume point at which playback of the image data is to resume. In this embodiment, the resume information specify the playback resume point by a scene (or image data) from which playback is to be resumed and a playback resume point in that scene.

In addition, the control unit 100 checks the first recording medium 107 to determine whether "by date" playlists are present or not. If no playlists are present, then the control unit 100 uses the management information processing unit 105 to create (B) "by date" playlists for each date as shown in FIG. 2.

In S406, the control unit 100 resumes playback based on the acquired resume information. If no resume information is present in S405, the control unit 100 resumes playback from the head of the first scene (for example, the scene with the earliest image sensing time) of the specified date.

The control unit 100 continues playback until an instruction to stop playback (not a pause instruction) is input via the operating unit 111 in S407 or playback of all of the scenes in the playlist is completed. During the playback, when an instruction to stop playback is input, for example, by pressing a stop button of the operating unit 111, the control unit 100 updates the corresponding resume information to information specifying a new playback resume point (S408).

Then, the control unit 100 also updates the corresponding playlist (S409). At this point, the digital video camera of the present embodiment updates the playlist so that the playback resume point of the playlist serves as a playback resume point in resume playback, since the digital video camera utilizes the playlist as resume information as described above.

If playback is carried out to the last scene of the playlist of a selected date without an instruction to stop playback after the start of playback, the playback automatically stops at that time. At this point, the control unit 100 deletes the resume information in S408, and deletes the resume playlist in S409.

Next, the control unit 100 determines whether the power is turned off or an instruction to move to another mode is issued (S428). If no instruction is issued, then the processing is returned to S401, whereas if the instruction is issued, the processing in the playback mode is finished.

Figure 3:
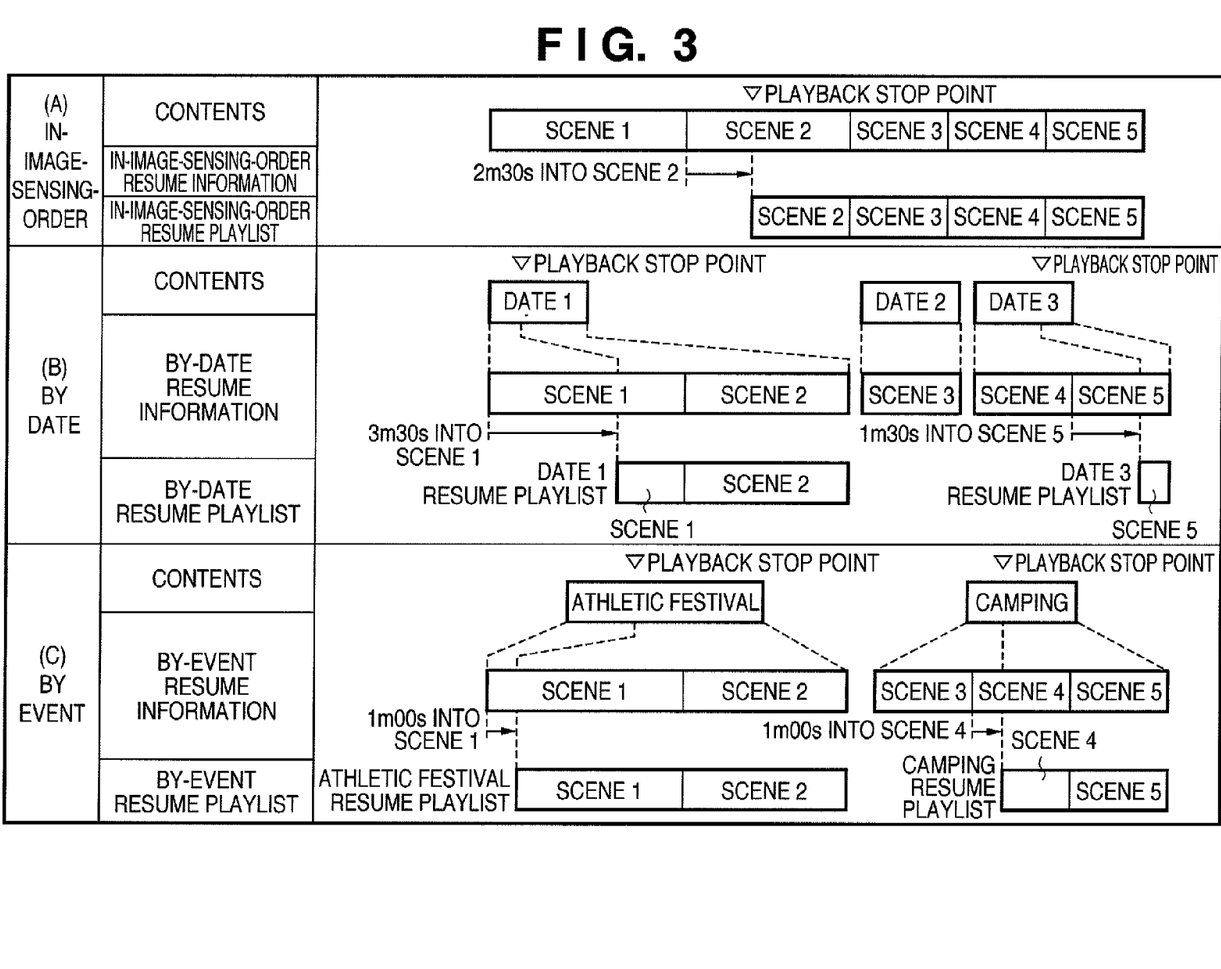
FIG. 3 is a diagram schematically illustrating examples of stop points and resume playlists in playback in the embodiment.

FIG. 3 is a diagram schematically illustrating examples of stop points and resume playlists in playback.

Although the playlists are represented according to the contents of the playback processing specified by the playlists here, the playlists in practice may alternatively include only scenes contained in the playlists and information for specifying playback sections including playback resume points, and need not include image data itself. In addition, a case will be here described in which the playback resume point in the resume information is equivalent to the playback stop point. However, as described above, the playback resume point may be a point corresponding to a next frame after the frame of the playback stop point.

Reference is now made to FIG. 3. FIG. 3 is a diagram schematically illustrating examples of stop points and resume playlists in playback in the embodiment. For the example (B) by date of FIG. 3, it is assumed that, in the processing in FIGS. 4A to 4C, an instruction to play back date 1 is issued, playback is resumed from the head of first scene 1 of date 1, and an instruction to stop the playback is issued when the playback is carried out for 3 minutes and 30 seconds.

In this case, as shown in (B) of FIG. 3, the resume information corresponding to date 1 is information for specifying 3 minutes 30 seconds into scene 1. In addition, the resume playlist corresponding to date 1 is updated so as to be a playlist that specifies resuming playback from the point 3 minutes 30 seconds into scene 1 and carrying out playback of entire scene 2 subsequent to scene 1.

As described above, resume information is recorded for each playlist in the present embodiment. Therefore, if a different date is specified in playback by date, resume information corresponding to the date is recorded. Further, the playlist itself is also updated.

For example, if an instruction to play back date 3 is issued, playback is resumed from the head of scene 4 in accordance with the playlist of date 3. Then, it is assumed that the playback of scene 4 is completed and an instruction to stop playback is issued when playback is carried out from the head of next scene 5 to 1 minute and 30 seconds into scene 5. In this case, the resume information of date 3 will be information for specifying 1 minute and 30 seconds into scene 5, and the resume playlist of date 3 is updated so as to specify playback from the point 1 minute and 30 seconds into scene 5 to the end of scene 5 ((B) in FIG. 3).

The resume playlists may include information for distinguishing the resume playlists from normal playlists. Specifically, information indicating that the playlist is a resume playlist can be included in a predetermined area in the playlist, for example, in an area available for information unique to a maker.

Therefore, if a playback apparatus understands resume playlists, control is possible to automatically present a menu of resume playback to a user if there is a resume playlist.

Returning to the description of FIG. 4B, if the user specifies display by event (S410), the control unit 100 groups together image data recorded on the first recording medium 107 by events (keywords), generates a display screen by event, and displays the display screen by event on the display unit 130 (S411). The display screen by event may have any format as long as users are able to select events (keywords). However, for example, the display screen by event may be a screen for displaying a list of keywords assigned to the image data recorded on the first recording medium 107. The control unit 100 waits for a playback instruction from a user through the display screen by event (S412).

The user operates the operating unit 111 to select, from the display screen by event, an event (keyword) which is desired to be played back, and presses the playback button included in the operating unit 111. The control unit 100 then acquires, from the first recording medium 107, resume information corresponding to the event selected on the display screen by event (S413).

In addition, the control unit 100 checks the first recording medium 107 to determine whether "by event" playlists are present or not. If there are no playlists present, then the control unit 100 uses the management information processing unit 105 to create (C) "by event" playlists for each event (keyword) as shown in FIG. 2.

In S414, the control unit 100 resumes playback based on the acquired resume information. If no resume information is present in S413, the control unit 100 resumes playback from the head of the first scene of the specified event (for example, the scene of the earliest image sensing time).

The control unit 100 continues playback until an instruction to stop playback (not a pause instruction) is input via the operating unit 111 in S415 or playback of all of the scenes in the playlist is completed. During the playback, when an instruction to stop the playback is input, for example, by pressing the stop button of the operating unit 111, the control unit 100 updates the corresponding resume information to information specifying a new playback resume point (S416). Then, the control unit also updates the corresponding playlist (S417).

Next, the control unit 100 determines whether the power is turned off or an instruction to move to another mode is issued (S428). If no instruction is issued, then the processing is returned to S401, whereas if the instruction is issued, the processing in the playback mode is finished.

Referring again to FIG. 3 briefly, (C) shows examples of resume "by event" playlists and resume information, where playlists are provided which have scenes grouped together with "athletic festival" and "camping" as keywords. Further, in the same way as the "by date" playlists, for each keyword, resume information is recorded and playlists are generated.

Returning to the description of FIG. 4C, processing will be described if in-image-sensing-order display is selected.

In the case of in-image-sensing-order display, unlike display by date or display by event, there is only one type of corresponding resume information. Therefore, the control unit 100 immediately acquires the resume information corresponding to the in-image-sensing-order display from the first recording medium (S419).

In addition, the control unit 100 checks the first recording medium 107 to determine whether an "in-image-sensing-order" playlist is present or not. If no playlist is present, then the control unit 100 uses the management information processing unit 105 to create a playlist as shown (A) in FIG. 2.

In S420, the control unit 100 displays information for specifying a scene including a playback resume point in the selected state on the display unit 130 (in-image-sensing-order display screen). For example, a representative image of the scene including the playback resume point may be displayed, or a thumbnail image may be generated from a moving image frame corresponding to the playback resume point by the bit map processing unit 110 to display the image at the playback resume point. The reason why the selected state is displayed is that there is only one choice in in-image-sensing-order playback, unlike display by date or display by event.

The control unit 100 waits for a playback instruction from a user through the in-image-sensing-order display screen (S421).

In S423, the control unit 100 resumes playback based on the resume information acquired in S419. If no resume information is present in S419, the control unit 100 resumes playback from the head of the scene with the earliest image sensing time.

The control unit 100 continues playback until an instruction to stop playback (not a pause instruction) is input via the operating unit 111 in S424 or playback of all of the scenes in the playlist is completed. During the playback, when an instruction to stop the playback is input, for example, by pressing the stop button of the operating unit 111, the control unit 100 updates the corresponding resume information to information specifying a new playback resume point (S426). Then, the control unit 100 also updates the corresponding playlist (S427).

Next, the control unit 100 determines whether the power is turned off or an instruction to move to another mode is issued (S428). If no instruction is issued, then the processing is returned to S401, whereas if the instruction is issued, the processing in the playback mode is finished.

Referring again to FIG. 3 briefly, (A) shows examples of in-image-sensing-order resume information and an in-image-sensing-order resume playlist if playback is stopped at a point 2 minutes and 30 seconds into scene 2.

As described above, the digital video camera of the present embodiment, when playback is stopped, not only records resume information for each playlist, but also records a playlist specified to resume playback from the point corresponding to the resume information.

Figure 5A:
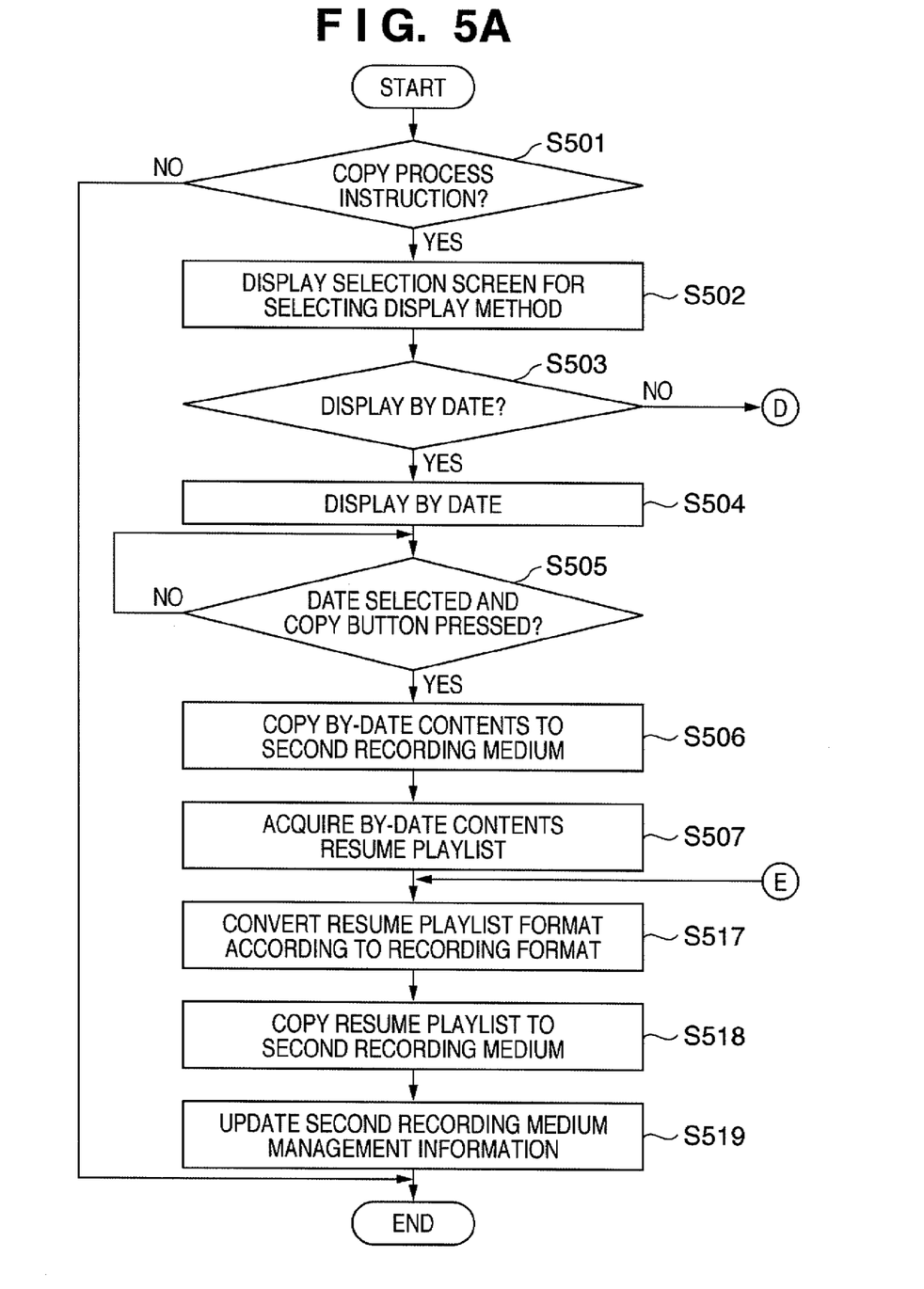
FIGS. 5A and 5B are flowcharts illustrating processing in the case of copying image data from a first recording medium to a second recording medium by the digital video camera according to the embodiment.
Figure 5B:
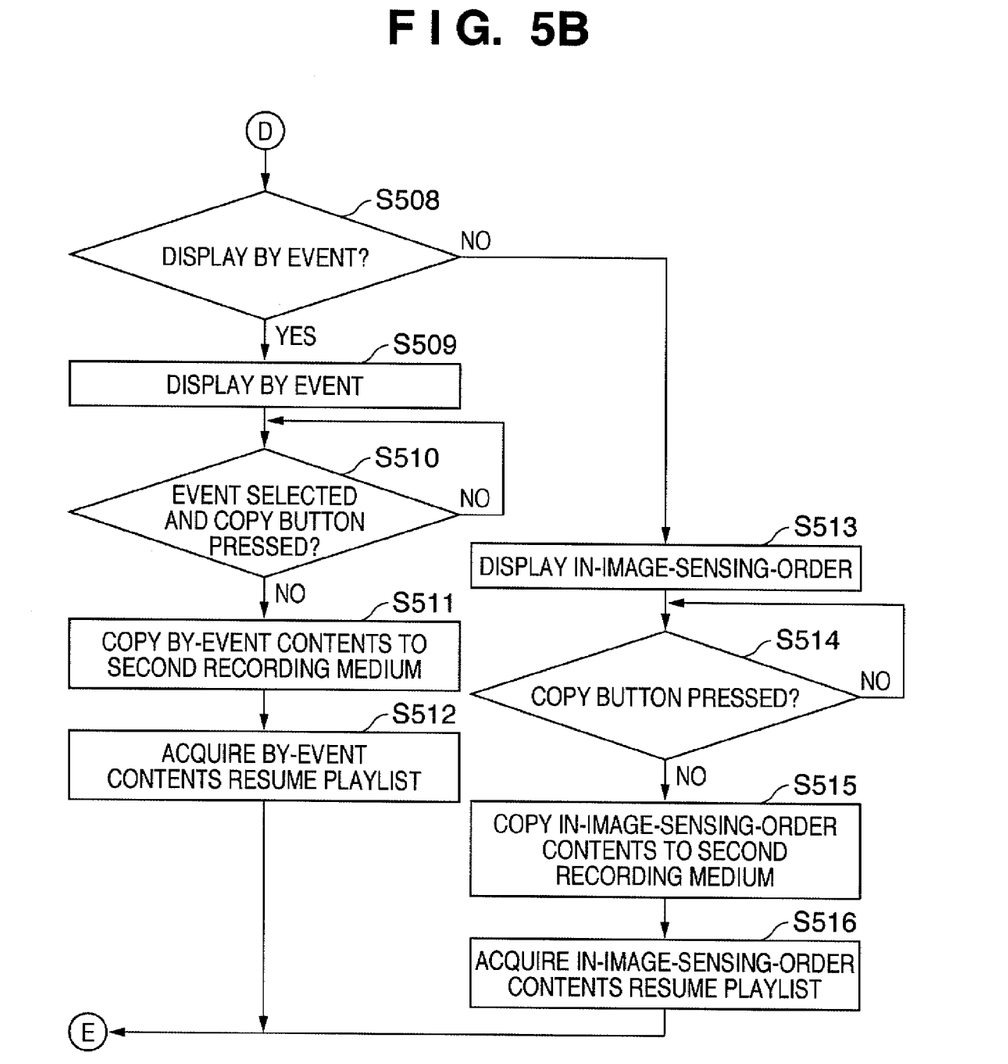

FIGS. 5A and 5B are flowcharts illustrating processing in an example where the first recording medium 107 is a built-in HDD, the second recording medium 109 is a memory card, and image data is copied from the built-in HDD to the memory card.

In S501, the control unit 100 determines whether or not an instruction is issued to execute a copy process from the first recording medium 107 to the second recording medium 109, for example, by operation of a menu screen or the like through the operating unit 111. The control unit 100 moves the processing to S502 if the instruction is issued, or finishes processing if the instruction is not issued.

In S502, the control unit 100 displays a selection screen for selecting a display method on the display unit 130 in the same way as in S401 in FIG. 4A.

When an instruction to select a display method is issued through the operating unit 111, the control unit 100 determines which display method is selected (S503 and S508).

If display by date is selected at this point, the control unit 100 generates a display screen by date and displays the display screen by date on the display unit 130 in the same way as in S403 (S504). The control unit 100 waits for a copy instruction from a user through the display screen by date (S505).

The user operates the operating unit 111 to select, from the display screen by date, an image sensing date which is desired to be copied, and presses a copy button included in the operating unit 111.

In response to the pressing of the copy button, the control unit 100 reads image data including scenes corresponding to the image sensing date selected on the display screen by date and a corresponding management information file. The image data and management information file are read from the first recording medium 107 through the first record/playback control unit 106. The control unit 100 then writes the image data and the management information file onto the second recording medium 109 through the second record/playback control unit 108 (S506).

Next, the control unit 100 reads a resume playlist corresponding to the image sensing date selected by the user. The resume playlist is read from the first recording medium through the first record/playback control unit 106 (S507). If playback has not been carried out in accordance with the playlist corresponding to the image sensing date selected by the user, the resume playlist is no different from the normal playlist, and has contents for specifying playback from the head of the first scene of scenes grouped together by image sensing date. If there is no playlist corresponding to the specified image sensing date, the control unit 100 uses the management information processing unit 105 to generate a playlist for the specified image sensing date, and uses that playlist as the resume playlist.

In S517, the control unit 100, if needed, converts or edits the acquired resume playlist into a playlist in a format that complies with the standard for playing back the image data from the copy destination recording medium (the second recording medium 109). In the present example, the second recording medium 109 is a memory card, so a playlist format that complies with the SD-Video standard can be used.

The control unit 100 writes, as one piece of the management information, the resume playlist onto the second recording medium 109 through the second record/playback control unit 108 (S518). Then, the control unit 100 updates the management information in the second recording medium 109 through the second record/playback control unit 108 so that the resume playlist is properly recognized (S519), and finishes the copy process.

Referring now also to FIG. 5B, if display by event is selected on the selection screen for selecting a display method in S508, the control unit 100 generates a display screen by event and displays the display screen by event on the display unit 130 in the same way as in S411 (S509). The control unit 100 then waits for an event selection and a copy instruction from a user through the display screen by event (S510).

When the copy button is pressed, the control unit 100 carries out the process of copying image data of scenes grouped together by event, a management information file, and a resume playlist, in the same way as if display by date is selected (S511, S512, and S517 to S519) except processing is responsive to a "by-event" playlist.

In S508, if display by event is not selected, (in-image-sensing-order display is selected), the control unit 100 carries out the in-image-sensing-order display in S513. The in-image-sensing-order display here is not based on resume information, but may display a representative image of the oldest one of the scenes recorded on the first recording medium 107.

The control unit 100 reads, in response to the pressing of the copy button (S514), a management information file corresponding to image data in the image sensing order from the first recording medium 107 through the first record/playback control unit 106, and then writes the management information file onto the second recording medium 109 through the second record/playback control unit 108 (S515).

Next, the control unit 100 reads an in-image-sensing-order resume playlist from the first recording medium through the first record/playback control unit 106 (S516). The subsequent processing beginning at S517 is as described above.

The image data copied to the second recording medium 109 in this way is able to be played back in any playback apparatus that supports playback in accordance with playlists. Specifically, if a user issues an instruction to carry out playback in accordance with a resume playlist recorded on the second recording medium, resume playback can be achieved from the previous playback stop point in the contents recorded on the second recording medium.

If the playback apparatus is an apparatus that has a function of updating resume playlists like the digital video camera of the present embodiment, the resume playlist on the second recording medium 109 can be updated by applying the processing described with reference to the flowchart in FIGS. 5A and 5B.

In this case, the resume playlist on the second recording medium 109 is consistently kept updated. Therefore, even if a first apparatus is used to carry out playback and then a second apparatus is used to carry out playback, and the first apparatus is again used carry out playback, the first apparatus is able to carry out resume playback from the continuation of the playback carried out by the second apparatus.

As described above, according to the present embodiment, playback control information making corresponding to a playback resume point is generated, and the corresponding playback control information is also recorded together with image data when the image data is recorded on another recording medium, thereby allowing resume playback to be achieved in any apparatus that is able to utilize the playback control information.

In addition, generating playback control information for each of groups of scenes that constitute image data allows resume playback for each group to be achieved.

Other Embodiments

In FIGS. 5A and 5B, a case is described in which the second recording medium 109 is a memory card. However, the second recording medium 109 may, for example, be another removable recording medium.

For example, if the second recording medium is an optical disc, a program chain (PGC) may be generated and updated as playback control information, rather than a playlist. The program chain refers to playback control information for an optical disc, specifically a DVD.

If the second recording medium 109 is an optical disc, a program chain may be initially generated, or a playlist may be generated which is to be converted into a program chain during recording. For example, the conversion may be carried out during execution of S518 in FIG. 5A.

In the embodiment described above, an example is described in which the present invention is applied to the digital video camera including the image sensing unit 120 and the camera signal processing unit 101. However, the image record/playback apparatus according to the present invention needs only to be able to generate and update resume information and playback control information when image data is played back and be able to output the image data and the playback control information. Therefore, it will be apparent that, as well as the image sensing unit 120 and the camera signal processing unit 101, the second record/playback control unit 108 and the second recording medium 109 are also dispensable if the image data and the playback control information are recorded in an external apparatus.

The embodiments described above can also be implemented as software by a system or an apparatus computer (or CPU, MPU or the like).

Therefore, a computer program supplied to a computer in order to implement the embodiments described above by such computer itself also implements the present invention. That is, a computer program for implementing the functions of the embodiments described above is itself within the scope of the present invention.

It should be noted that a computer program for implementing the embodiments described above may be in any form provided that it is computer-readable. Such a program may be executed in any form, such as an object code, a program executed by an interpreter, or script data supplied to an OS, but is not limited thereto. The computer may be a general purpose computer, or alternatively special purpose processor, for example, included in a conventional video camera or other image processing apparatus.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

A server device that provides program data files for implementing the functional processes of the present invention by computer to one or more client computers is also covered by the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

In addition, the computer program for implementing the embodiments described above may utilize the functions of an OS running on the computer.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-122801, filed on May 7, 2007, which is hereby incorporated by reference herein in its entirety.

What is claimed is:

1. An image processing apparatus comprising:
 a playback unit configured to play back moving image data from a first recording medium on which the moving image data is recorded;
 a recording unit configured to record the moving image data played back from the first recording medium on a second recording medium different from the first recording medium;
 a playlist processing unit configured to generate a plurality of playlists, each playlist designating a plurality of scenes selected from the moving image data recorded on the first recording medium and indicating a playback order of the designated plurality of scenes;
 a first selection unit configured to select, from the plurality of playlists, a playlist for a playback operation from the first recording medium;
 a second selection unit configured to select, from the plurality of playlists, a playlist for a copy operation from the first recording medium to the second recording medium; and
 a control unit configured to control the playback unit in accordance with the playlist selected by the first selection unit to play back the plurality of scenes of the moving image data designated by the selected playlist in the playback order indicated in the selected playlist and to stop the playback operation in response to a playback stop instruction, wherein the playlist processing unit changes, in response to the playback stop instruction, a playback start position of the selected playlist in accordance with a playback stop position at which the playback operation of the plurality of scenes of the moving image data designated by the selected playlist is stopped, such that the playback operation of the plurality of scenes of the moving image data may resume from a position relating to the playback stop position and the playback operation continues according to the playback order indicated in the selected playlist upon resuming the playback operation, wherein the control unit controls a copy operation of the moving image data from the first recording medium to the second recording medium in accordance with the playlist selected by the second selection unit, and wherein, if a playlist having a changed playback start position is selected by the second selection unit, the control unit controls the playback unit and the recording unit such that a plurality of scenes of the moving image data designated by the selected playlist is played back from the first recording medium and is recorded on the second recording medium including the changed playback start position.

2. The image processing apparatus according to claim 1, wherein the playlist processing unit selects a plurality of scenes for each of a plurality of different conditions from the moving image data recorded on the first recording medium and generates a plurality of playlists corresponding to the plurality of different conditions.

3. The image processing apparatus according to claim 1, wherein, if the playlist having the changed playback start position is selected by the first selection unit, the control unit controls the playback unit such that the playback operation of the plurality of scenes of the moving image data is started from the changed playback start position and is performed according to the playback order indicated in the playlist having the changed playback start position.

4. The image processing apparatus according to claim 1, further comprising:
an image pickup unit; and
an image recording unit configured to record moving image data generated by the image pickup unit on the first recording medium.

5. A method of controlling an image processing apparatus comprising:
playing back moving image data from a first recording medium on which the moving image data is recorded;
recording the moving image data played back from the first recording medium on a second recording medium different from the first recording medium;
generating a plurality of playlists, each playlist designating a plurality of scenes selected from the moving image data recorded on the first recording medium and indicating a playback order of the designated plurality of scenes;
selecting a playlist from the plurality of playlists for a playback operation from the first recording medium;
selecting a playlist from the plurality of playlists for a copy operation from the first recording medium to the second recording medium;
controlling playback of the plurality of scenes of the moving image data in accordance with the selected playlist for a playback operation to play back the plurality of scenes in the playback order indicated in the selected playlist;
stopping the playback operation of the plurality of scenes of the moving image data in response to a playback stop instruction; and
changing, in response to the playback stop instruction, a playback start position of the selected playlist in accordance with a playback stop position at which the playback operation is stopped such that the playback operation of the plurality of scenes of the moving image data may resume from a position relating to the playback stop position, and continuing the playback operation according to the playback order indicated in the selected playlist upon resuming the playback operation,
wherein controlling playback includes copying the moving image data from the first recording medium to the second recording medium in accordance with the selected playlist for a copy operation, and
wherein, if a playlist having a changed playback start position is selected for the copy operation, controlling playback includes playing back the plurality of scenes of the moving image data designated by the selected playlist from the first recording medium and recording the plurality of scenes of the moving image data designated by the selected playlist on the second recording medium including the changed playback start position.

6. The method according to claim 5, wherein generating the plurality of playlists of the moving image data further includes:
selecting a plurality of scenes for each of a plurality of different conditions from the moving image data recorded on the first recording medium; and
generating a plurality of playlists corresponding to the plurality of different conditions.

7. The method according to claim 5, wherein, if the playlist having the changed playback start position is selected as the playlist for a playback operation, controlling playback of the plurality of scenes of the moving image data further includes starting playback operation from the changed playback start position.

8. The method according to claim 5, further comprising recording moving image data generated by an image pickup apparatus on the first recording medium.

* * * * *